Aug. 31, 1954 A. L. FREEDLANDER 2,688,070
ELECTRICALLY HEATED MATTRESS CONSTRUCTION
Filed March 14, 1950 2 Sheets-Sheet 1

*INVENTOR.*
A. L. FREEDLANDER
BY
ATT'Y.

Aug. 31, 1954    A. L. FREEDLANDER    2,688,070
ELECTRICALLY HEATED MATTRESS CONSTRUCTION
Filed March 14, 1950    2 Sheets-Sheet 2

*INVENTOR.*
A. L. FREEDLANDER
BY
ATT'Y.

Patented Aug. 31, 1954

2,688,070

UNITED STATES PATENT OFFICE 2,688,070

ELECTRICALLY HEATED MATTRESS CONSTRUCTION

Abraham Lincoln Freedlander, Dayton, Ohio, assignor to The Dayton Rubber Company, a corporation of Ohio Application March 14, 1950, Serial No. 149,565

5 Claims. (Cl. 219—46)

This invention relates to electrically heated foam rubber cushioning or bedding structures, such as mattresses, pads, cushions, pillows, blankets, and the like, and has as its object provision of a structure of this character which will be efficient, safe, and inexpensive to manufacture.

It has been proposed to incorporate electric heating elements in mattresses of conventional construction which are composed of cotton and/or hair pads either with or without metal springs incorporated therein. Certain problems have militated against the practical development of these types of electrically heated mattresses in view of the high heat insulating properties of the thick mattress sections which necessitated heating the metallic heating elements to fairly high temperatures thereby increasing dangers of combustion of the highly flammable components of the mattress. The same difficulties have been applicable to pads, cushions, and similar articles. Applicant has now discovered that foam rubber, due to its stereoreticulate or intercommunicating cell structure, may be readily heated without the necessity for an excessive temperature gradient by embedding therein electrical heating elements of a suitable type. The term "stereoreticulate" as used herein refers to the intercommunicating nature of the cell structure of foam rubber, and has been referred to in detail in numerous patents, among them the patent to Talalay No. 2,432,353, as referred to below. "Foam rubber" is the term now commonly applied to a type of sponge rubber which is made from aqueous dispersions of natural or synthetic rubber. This product is made by foaming such aqueous dispersions either mechanically as by beating, or whipping, or the like, or chemically by the decomposition of hydrogen peroxide or similar materials to liberate gaseous oxygen. The foamed material is coagulated, molded and vulcanized while in the foamed condition, the resulting product being a light, porous rubber material having an intercommunicating cell structure. Typical methods for the manufacture of this product are described in the Chapman et al. Patent No. 1,852,447, the Wolf Patent No. 2,138,081, and the Talalay Patent No. 2,432,353. This type of material, because of its interconnecting cell structure, will permit circulation of air and will therefore also permit circulation of heat by convection as well as by conduction and radiation. The air circulation is improved during use of the material for cushioning purposes by body movements producing a "breathing" effect. These properties are in direct contrast to the high heat insulating effects obtained with conventional material, such as cotton or felt, or with ordinary types of chemical sponge which necessitate the development of substantially higher temperatures internally thereof to permit the transmission of heat.

The term "rubber" as used herein is intended to include natural rubber as well as synthetic rubber-like materials, such as the conjugated diolefine polymers and copolymers with styrene and acrylic nitrile, the polyhaloprenes, such as neoprene, butyl rubber, and the like.

In accordance with the present invention, it has been found that foam rubber mattresses may be satisfactorily heated to temperatures within the range desired for comfort by individuals sleeping on these mattresses by incorporating therein heating means of the following types:

a. By lamination with a layer of electrically conductive rubber, this layer constituting a resistance element through which an electric current is passed.

b. By forming the foam rubber with a portion or layer thereof of electrically conductive foam and passing therethrough an electric current to effect heating by resistance.

c. By embedding resistance elements in a layer of rubber and superimposing thereon one or more layers of foam and with heat being provided by passage of electric current through said heating elements.

Further details of the invention described herein are contained in the description below and in the accompanying drawings, wherein.

Figure 1:
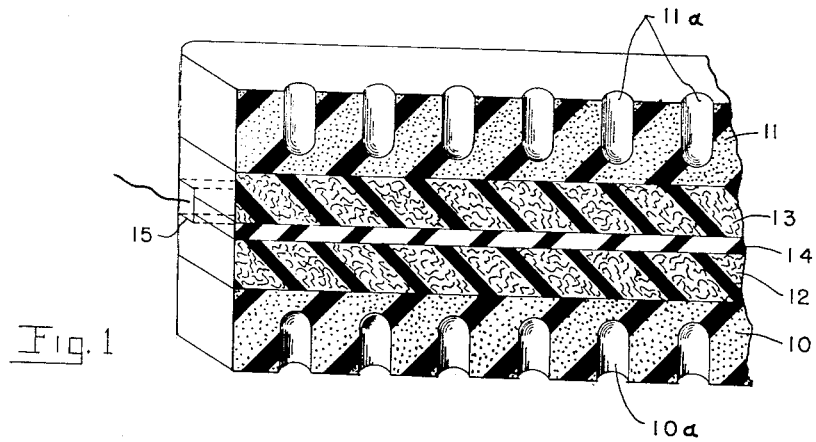
Figure 1 represents a vertical cross sectional view partly in elevation through a portion of a laminated mattress construction of the type described herein.

In the drawings, lines 10 and 11 of Figure 1 represent the top and bottom layers composed of foam rubber, while layers 12 and 13 may be either entirely of foam rubber or of combination curled hair and foam of the type described in the Howard Patent No. 2,159,213. These layers may be cored, as shown at 10a or 11a, or not, as desired. Intermediate layer 14 is a relatively thin sheet or layer of electrically conductive rubber compounded by milling acetylene black into a conventional rubber compound which is then formed into a sheet of desired size and vulcanized.

Figure 2:
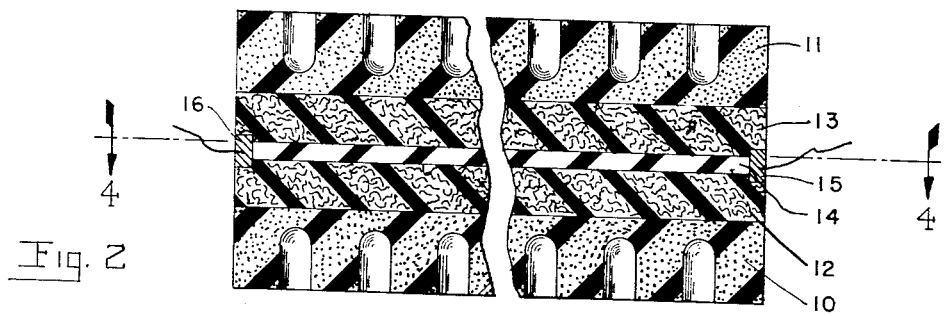
Figure 2 represents a vertical cross sectional view through a mattress constructed in accordance with the invention showing the structure at both ends with the middle portion of the mattress eliminated.

Figure 2 is a cross sectional view of the same construction as Figure 1, where the metal connectors at opposite ends of the mattress are illusrated. Element 15 is a bar of copper or other metal clamped or otherwise secured along one edge of conductive sheet 14, while 16 is a similar metallic conductor secured to the opposite edge of the sheet. Intermediate layer 14 may also be formed of foam rubber which has been made electrically conductive by incorporating acetylene black in the latex prior to formation of the foam. If desired, layer 14 may be omitted and layer 12 or 13 or both may be made electrically conductive by incorporating acetylene black in the foam during manufacture of these layers.

Figure 3:
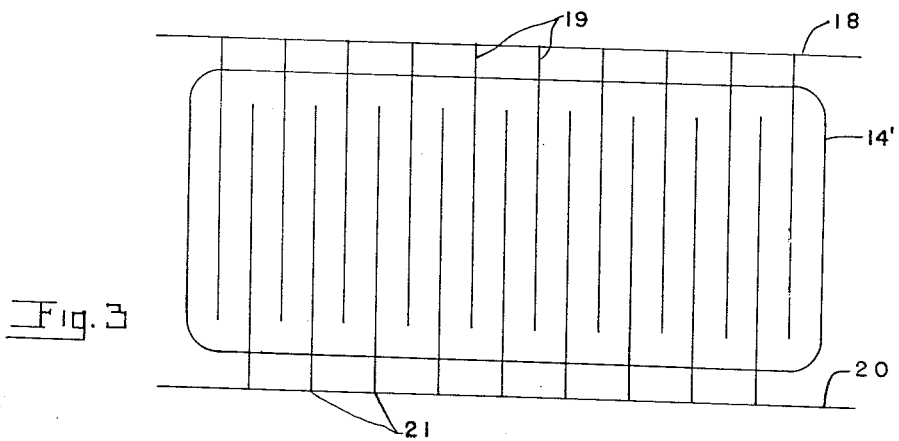
Figure 3 illustrates diagrammatically a modified form of the invention showing spaced conductors in parallel.

Figure 3 illustrates a modified form of the invention described in Figures 1 and 2 which is adapted for use where a shorter current path is desired especially where the rubber compound is of fairly high resistance. In this figure a plurality of spaced conductors 19 are embedded in layer 14', which may replace layer 14 of Figures 1 and 2, and all of these are connected to lead 18. In parallel with 19 a plurality of spaced conductors 21 are arranged or connected to lead 20. This will result in the formation of a plurality of short paths for current to flow.

Figure 4:
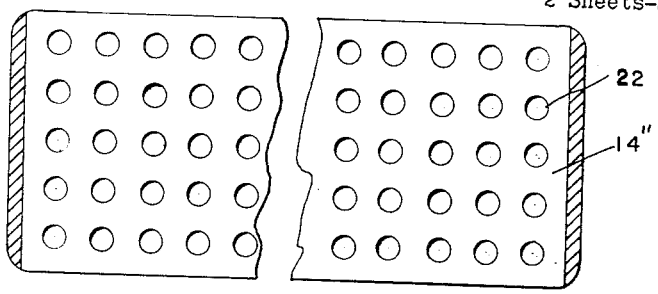
Figure 4 is a horizontal cross sectional view taken along lines 4—4 of Figure 2.

Figure 4 illustrates a top plan view of a modified form of the electrically conductive sheet layer 14 of Figures 1 and 2, in which a plurality of openings or perforations 22 are formed in a conductive rubber sheet layer 14" in order to facilitate circulation of air through the mattress and also to reduce the weight of this layer.

Figure 5:
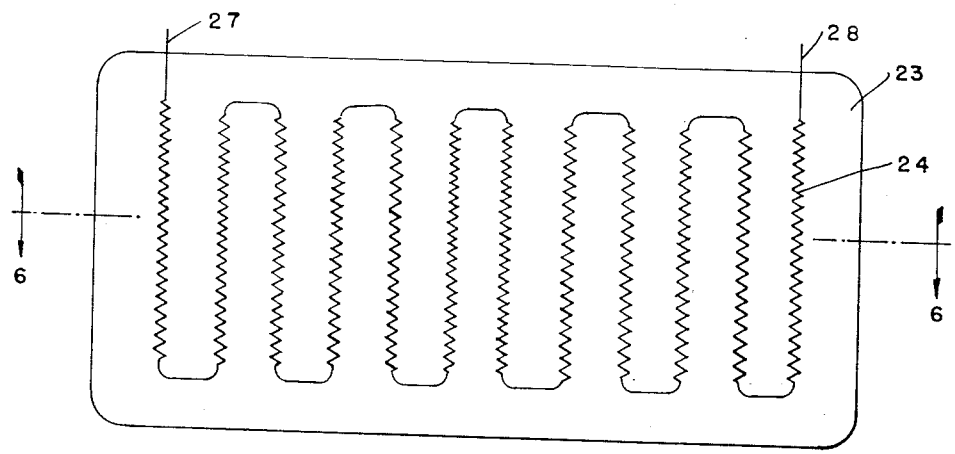
Figure 5 illustrates diagrammatically the arrangement of a resistance element in an intermediate layer of the mattress.
Figure 6:
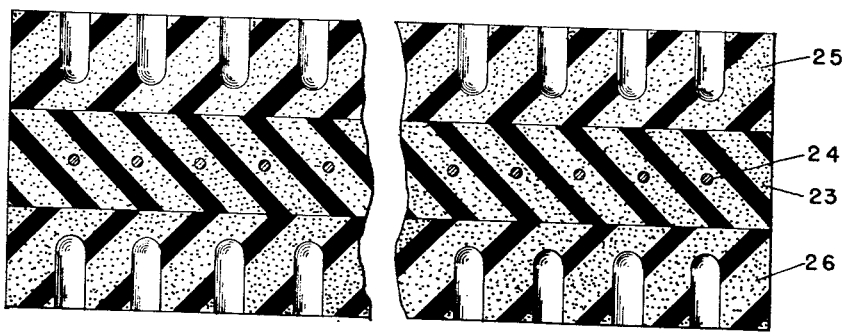
Figure 6 is a vertical cross section of another form of mattress construction embodying the present invention taken along lines 6—6 of Figure 5.

In Figures 5 and 6 a modified form of the invention is described in which a metallic electrical resistance element 24 is embedded in a sheet or layer of rubber 23. This sheet is then interposed between layers of foam 25 and 26, and replaces sheet 14 or 14" described in Figures 1, 2 and 4. This layer may be composed of natural or synthetic rubber and may preferably be formed of neoprene which has the additional advantage of being non-inflammable. Layer 23 may be either of bulk rubber or may be of foam or combination hair-foam material. Current is conducted through the resistance element through leads 27 and 28. In order to permit air circulation through the mattress, layer 23 may be perforated in the manner described for 14" in Figure 4.

Current is passed through the conductive rubber as a resistance element, thereby resulting in the desired amount of heating. The current flow is controlled thermostatically or otherwise, for example by means illustrated in the patent to Kearsley No. 2,195,958. The temperature rise required is generally of a low order, since only a slight heating of the mattress is required. The large heating surface provided by the layer also eliminates need for higher local temperatures required with metallic elements.

The conductive rubber compositions which are utilized as the resistance heating elements in Figures 1, 2 and 4 are generally prepared by the incorporation of acetylene black. The conductivity of electricity through rubber-carbon black compositions is attributed to the formation of chains of particles through the rubber. Conventional rubber compounds compounded with ordinary reinforcing blocks, have resistivities above $10^7$ ohm-cm. By using high loadings of channel black the resistivity can be reduced considerably. With certain types of carbon black the resistivity can be reduced to very low values. Acetylene black has been found to be the best type of conductive black to use for electrically conductive rubbers. In general, the term "electrically conductive rubber" is applied to a rubber compound having a resistivity of less than $10^7$ ohm-cm. Such rubbers are intended for use as the resistance heating elements in the form of the invention described in Figures 1, 2 and 4. The proportion of acetylene black or other conductive black utilized in the compound will depend on the desired electrical resistance of the rubber. This will, of course, depend on the desired temperature gradient, the current condition, the dimension of the conductive rubber member, etc. Generally from 20 to 120 parts of acetylene black for each 100 parts of rubber will provide suitable resistivity. For example, a smoked sheet rubber mixture compounded with 40 parts of acetylene black and the usual compounding ingredients had a resistivity of 174 ohm-cm. The same type of compound with 120 parts of acetylene black had a resistivity of about 7 ohms-cm. Resistivities below this are generally not required or advisable. Similar results are obtained by using neoprene or other syntheteic rubber-like materials in place of natural rubber. In making conductive foam the acetylene black or the like is dispersed in the latex prior to foaming. Otherwise the procedure is the same as usually followed in foam manufacture.

For a typical mattress construction, where the ultimate thickness is to be say 4½ in., two 2 in. layers of foam are provided with a ½ in. layer of conductive rubber therebetween. Where a conductive foam is to be used, a layer ½ in. to 1½ in. in thickness may be sandwiched between layers of conventional foam.

I claim:

1. An electrically heated cushioning structure comprising a central layer of electrically conducting rubber positioned between contiguous intermediate layers formed of a mixture of foam rubber and hair, said intermediate layers being positioned between top and bottom layers consisting of foam rubber, and means for conducting electric current through said central conducting layer whereby said layer is heated by its resistance to said current.

2. A mattress construction according to claim 1 wherein said central conducting rubber layer is composed of electrically conductive foam rubber.

3. An electrically heated mattress construction comprising top and bottom layers of foam rubber, said foam rubber having a stereoreticulate intercommunicating cell structure permitting air circulation through the interconnecting cells thereof, a layer of electrically conductive foam rubber having electrically conductive carbon black incorporated therein as a component of the rubber compound, and means for conducting an electric current through said layer of conductive foam rubber whereby the structure is heated by the electrical resistance of said layer and whereby the air heated thereby circulates through the mass of foam rubber and through the interconnected cell structure thereof.

4. An electrically heated mattress construction comprising top and bottom layers of foam rubber said foam rubber having a stereoreticulate intercommunicating cell structure permitting air circulation through the interconnecting cells thereof, a layer of electrically conductive rubber embedded between said foam rubber layers, and means for conducting an electric current through said layer of conductive rubber whereby the structure is heated by the electrical resistance of said layer, said layer of conductive rubber being formed with a plurality of perforations in order to facilitate circulation of air through the mattress.

5. An electrically heated cushioning member comprising top and bottom layers of foam rubber said foam rubber having a stereoreticulate intercommunicating cell structure permitting air circulation through the interconnecting cells thereof, a layer of electrically conductive rubber embedded between said foam rubber layers, and means for conducting an electric current through said layer of conductive rubber whereby the structure is heated by the electrical resistance of said layer, said layer of conductive rubber being formed with a plurality of openings therethrough in order to facilitate circulation of air through the cushioning member.

References Cited in the file of this patent

UNITED STATES PATENTS

| Number | Name | Date |
| --- | --- | --- |
| Re. 21,474 | McCleary | June 4, 1940 |
| 752,147 | Derick | Feb. 16, 1904 |
| 1,979,082 | Schwedenberg et al. | Oct. 30, 1934 |
| 1,997,899 | Dick | Apr. 16, 1935 |
| 2,042,606 | Kotowski | June 2, 1936 |
| 2,159,213 | Howard | May 23, 1939 |
| 2,255,376 | Bull et al. | Sept. 9, 1941 |
| 2,274,840 | Marick et al. | Mar. 3, 1942 |
| 2,288,232 | Driscoll | June 30, 1942 |
| 2,305,717 | La Bell | Dec. 22, 1942 |
| 2,340,097 | Woodman | Jan. 25, 1944 |
| 2,411,677 | Christenson | Nov. 26, 1946 |
| 2,429,137 | Root | Oct. 14, 1947 |
| 2,467,349 | Van Daam | Apr. 12, 1949 |
| 2,472,214 | Hurvitz | June 7, 1949 |